United States Patent [19]

Dangel

[11] Patent Number: 5,554,080
[45] Date of Patent: Sep. 10, 1996

[54] SPEED REDUCING MECHANISM AND TRANSMISSION DEVICE HAVING TWO RANGES OF SPEED RATIOS FOR A MOTOR VEHICLE

[76] Inventor: Henry Dangel, 54 Avenue de la lère D.B., 68100 Mulhouse, France

[21] Appl. No.: 356,893

[22] Filed: Dec. 15, 1994

[30] Foreign Application Priority Data

Dec. 15, 1993 [FR] France .................. 93 15117

[51] Int. Cl.⁶ ........................................ F16H 37/08
[52] U.S. Cl. ...................... 475/204; 475/200; 475/221; 475/198
[58] Field of Search ........................ 475/198, 200, 475/203, 204, 221, 314, 298, 300

[56] References Cited

U.S. PATENT DOCUMENTS

| | | | |
|---|---|---|---|
| 4,440,042 | 4/1984 | Holdeman | 475/346 X |
| 4,462,271 | 7/1984 | Stieg | 475/198 X |
| 4,677,873 | 7/1987 | Eastman et al. | 475/204 |
| 4,677,875 | 7/1987 | Batchelor | 475/204 X |
| 4,920,828 | 5/1990 | Kameda et al. | 475/204 X |
| 5,042,610 | 8/1991 | Shiraishi et al. | 475/221 X |
| 5,176,590 | 1/1993 | Haydock | 475/346 X |

FOREIGN PATENT DOCUMENTS

| | | |
|---|---|---|
| 0421112 | 4/1991 | European Pat. Off. . |
| 940256 | 12/1948 | France . |
| 1109537 | 1/1956 | France . |
| 1162024 | 9/1958 | France . |
| 2532708 | 3/1984 | France . |

Primary Examiner—Charles A. Marmor
Assistant Examiner—Peter Kwon
Attorney, Agent, or Firm—Wenderoth, Lind & Ponack

[57] ABSTRACT

The speed reducing mechanism employing a planetary gear train can be interposed between a ring (36), engaged with an output gear (13) of the gearbox, and the case (16) which constitutes the input element of the differential. In this speed reducing mechanism, the ring is rotatively guided on two smooth journals and the reducing mechanism can be locked by means of a shifting sleeve (46). Such a simple, small and inexpensive arrangement permits improving the motricity of vehicles having two or four driving wheels, for example of the type capable of travelling over all types of roads and tracks.

8 Claims, 4 Drawing Sheets

5,554,080

SPEED REDUCING MECHANISM AND TRANSMISSION DEVICE HAVING TWO RANGES OF SPEED RATIOS FOR A MOTOR VEHICLE

BACKGROUND OF THE INVENTION

The present invention relates to speed reducing mechanisms and transmission devices for motor vehicles.

It concerns in particular vehicles capable of travelling over all types of roads and tracks i.e. the type which have terrain crossing capabilities greater than those of normal road vehicles but may be nonetheless derived from standard production models. These vehicles may have two or four driving wheels, the two additional driving wheels being in permanent operation or brought into operation under the control of the driver.

It is known that such vehicles may sometimes be handicapped by lack of motricity, i.e. driving power, in which case it is desirable to have available a shorter or narrower range of speed ratios compensating for this lack of motricity. The known solution for making available this second range of speeds entails providing a specific gearbox equipped with a speed reducing mechanism which permits establishing the two desired ranges of ratios in this gearbox.

Such a solution is both complicated and expensive: indeed, it requires adapting to the same vehicle either a conventional gearbox or a special gearbox which does not have the same overall size. Further, in view of the fact that in a power unit and in particular a power unit disposed transversely relative to the longitudinal direction of the vehicle, the case of the gearbox is generally integrated with the engine unit and the housing of the differential and therefore, the fact of having to provide two different gearboxes has an incidence on the adjacent elements of the power unit and increases the cost.

Lastly, if the speed reducer is disposed at the input of the gearbox, the dimensions of the latter must be increased in order to be capable of transmitting the higher torques when the short range is chosen, which correspondingly increases the cost of the device.

SUMMARY OF THE INVENTION

An object of the present invention is to provide a speed reducing mechanism and a transmission device which affords two ranges of speed ratios, without modification of the gearbox, in a small space and at a cost which is as low as possible.

The invention therefore provides a speed reducing mechanism of the type having a planetary gear train. The mechanism includes a case, a planet carrier rotatively mounted in the case, a ring having external gear teeth and internal gear teeth, a sun gear and planet gears engaged with the sun gear and with the internal gear teeth of the ring. The planet carrier includes a first radial flange defining at least one cylindrical journal which rotatively supports the ring.

According to other features of the invention:

the first radial flange of the planet carrier carries a parallel second radial flange which defines with the first radial flange a space receiving the planet gears and which further defines a cylindrical journal located in the extension of the cylindrical journal of said first radial flange; said two journals rotatively guiding the ring.

The ring has a T-shaped cross section of which a vertical branch is received and laterally guided in the space between the two flanges and of which the lower parts of two horizontal branches cooperate with the cylindrical journals of the two flanges.

The planet carrier includes an axial part defining a cylindrical journal which rotatively supports the sun gear.

Means are provided for putting the speed reducing mechanism into either one of two states. The means including a shifting sleeve mounted to be slidable between two positions, namely a first position in which it renders two elements of the planetary gear train speed reducing mechanism relatively fixed thereby locking the mechanism, and a second position in which it releases the two elements and fixes one thereof relative to the case.

The shifting sleeve includes internal splines permanently engaged with corresponding external splines provided on an axial extension of the sun gear of the speed reducing mechanism and at least one external set of gear teeth which are selectively engageable with an internal set of gear teeth provided on the planet carrier of the speed reducing mechanism, or with an internal set of gear teeth provided on an element fixed to the case.

The internal set of gear teeth provided on the planet carrier is arranged on the second radial flange fixed to the first radial flange of the planet carrier.

The invention also provides a transmission device including a gearbox and at least one differential disposed in at least one case. The gearbox includes an output gear and the differential comprises a housing which constitutes the input element and which is connected to a ring engaged with the output gear of the gearbox. A planetary gear train speed reducing mechanism such as that defined hereinbefore is interposed between the ring and the housing of the differential, means being provided for putting the speed reducing mechanism in either one of two states: namely a first state in which it is locked and introduces no speed reduction and a second state in which it operates as a speed reducer.

BRIEF DESCRIPTION OF THE DRAWINGS

The invention will be described in more detail hereinafter with reference to the accompanying drawings which are given solely by way of examples and in which.

DETAILED DESCRIPTION OF A PREFERRED EMBODIMENT

Figure 1:
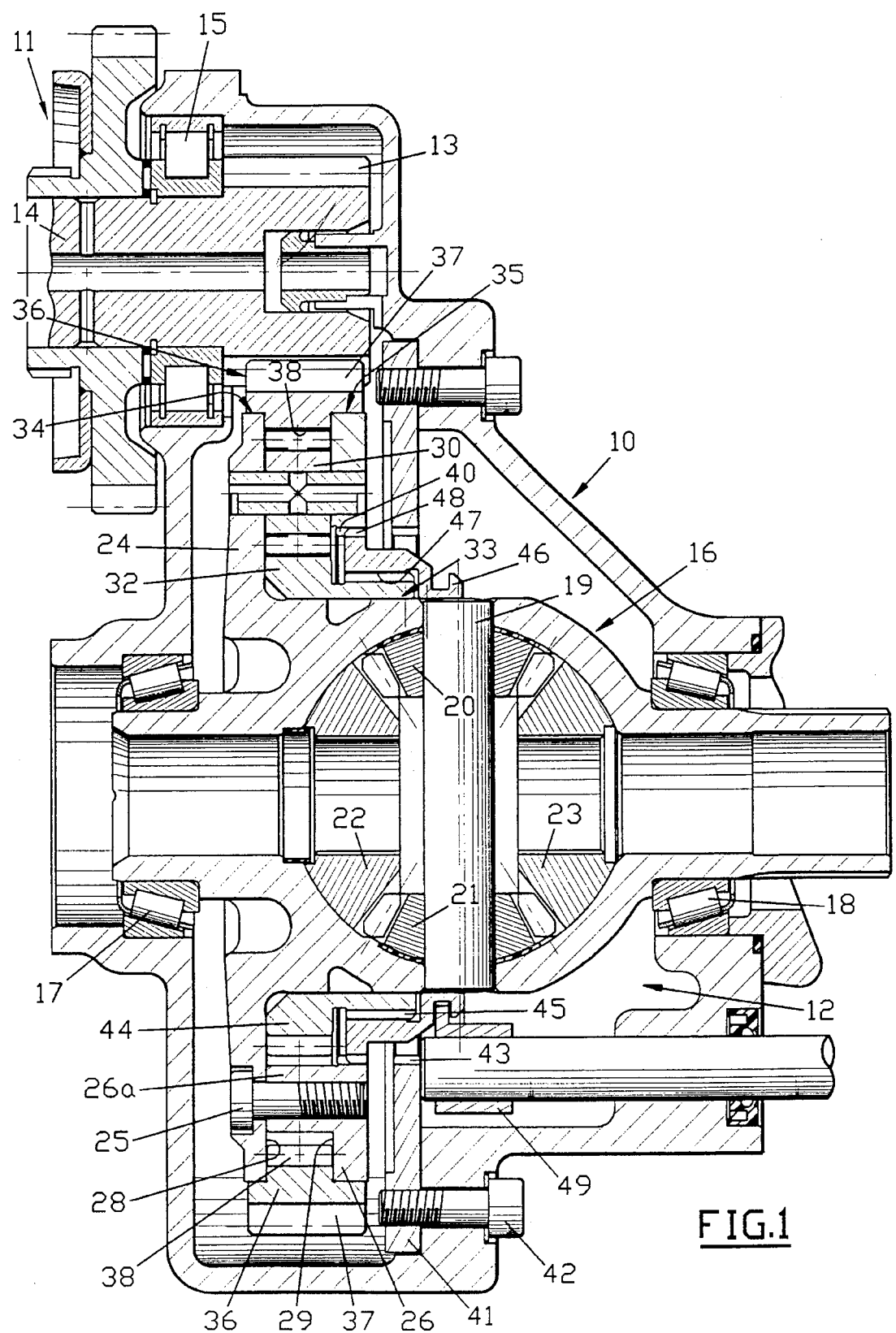
FIG. 1 is a sectional view taken on line 1—1 of FIG. 3 of a part of a transmission device according to the invention.
Figure 2:
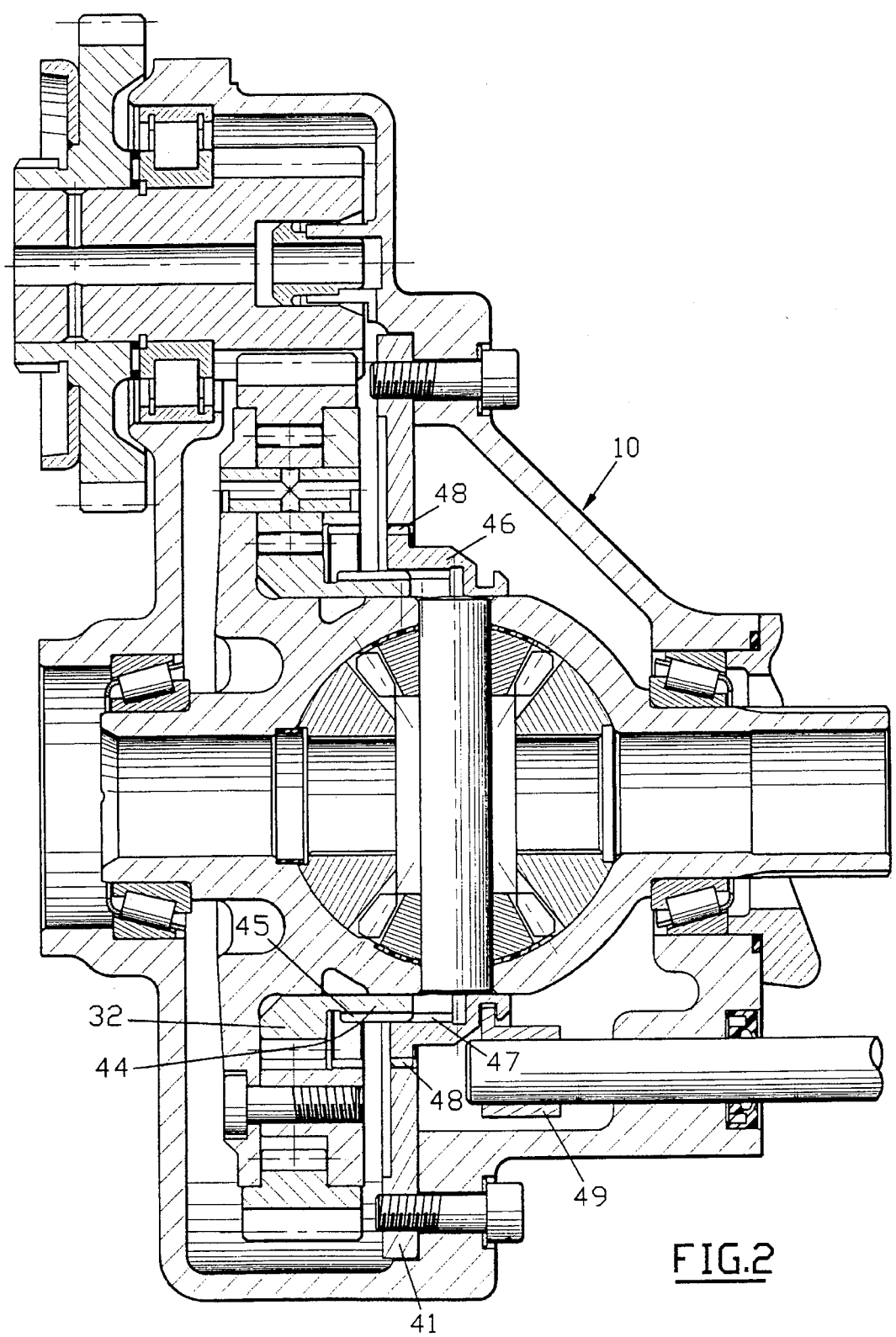
FIG. 2 is a view similar to FIG. 1 showing the device in a second position of utilization.
Figure 3:
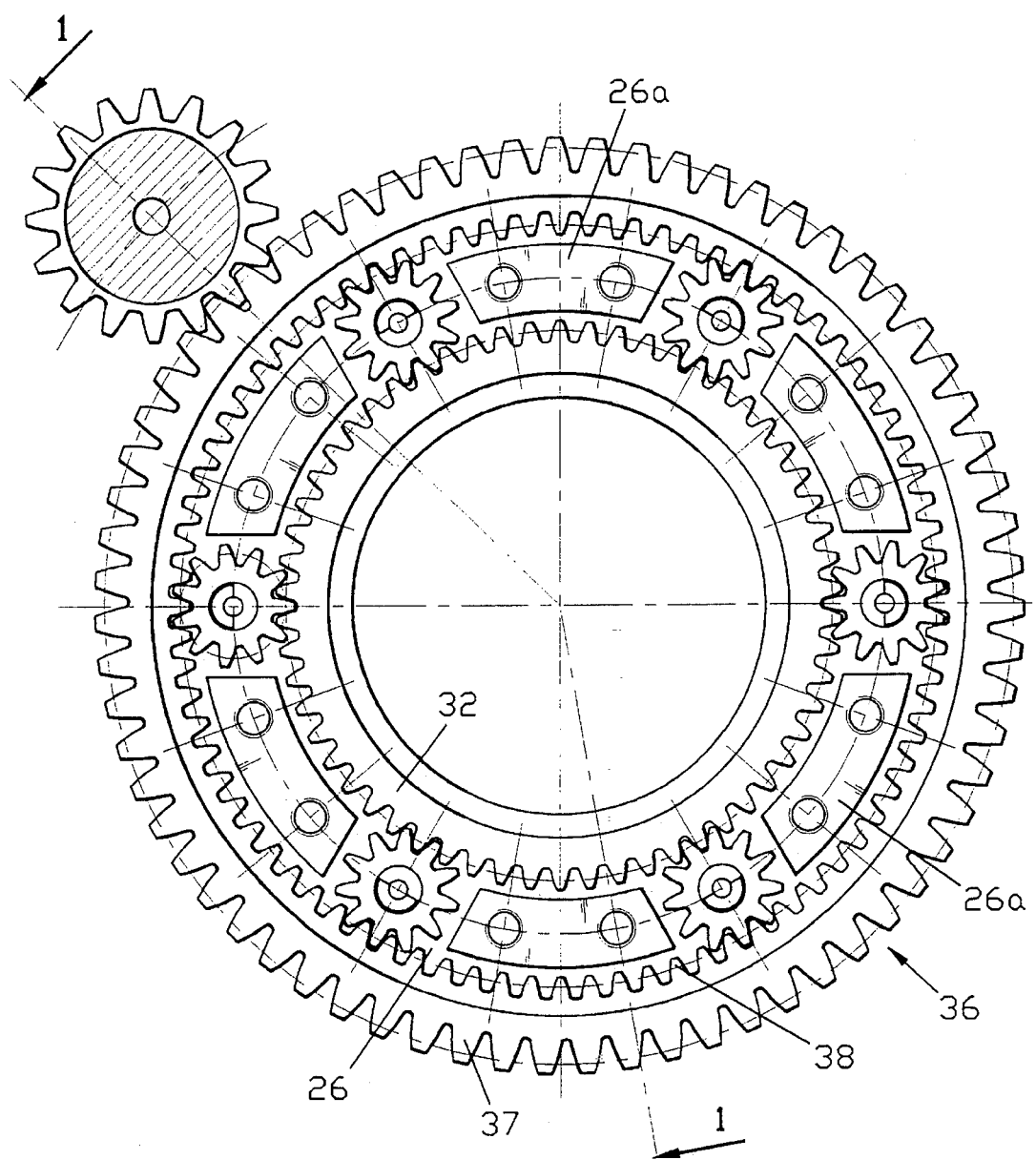
FIG. 3 is a side elevational view of the speed reducer, with the differential case removed.

Shown in FIGS. 1 to 3 is a part of a power unit, namely the engine and the gearbox of a motor vehicle, which is disposed transversely relative to the longitudinal direction of the vehicle. Only the parts of the device needed for the comprehension of the invention are shown. Consequently, the engine proper and the essential part of the gearbox have not been shown in these drawings.

Shown in FIG. 1 is a part 10 of a case of the gearbox 11 and differential 12, together with an output gear 13 of the gearbox. A shaft 14 to which the output gear is fixed is rotatively mounted in the case by rolling bearings, such as the bearing 15.

The differential 12 is disposed in the case and includes a housing 16 rotatively supported in the case by two tapered roller bearings 17 and 18. The differential further includes, in a known manner, a planet carrier 19 and planet gears 20, 21 engaged with sun gears 22 and 23 for connection to transmission shafts (not shown) adapted to drive the two front wheels of a vehicle.

The means for driving a rear driving shaft of the vehicle from the housing of the differential also have not been shown in the drawings.

The housing 16 of the differential includes a radial flange 24 to which is secured by studs 25 a second annular flange 26. Projecting parts 26a determine the width of the free space provided between two confronting faces 28, 29 of the flanges 24, 26 for receiving planet gears 30 rotatively mounted on hollow shafts 31 and a sun gear 32 which is engaged with the planet gears and rotatively mounted on a cylindrical journal 33 of the housing of the differential. If desired, the planet gears 30 may be mounted on needle bearings.

Further, the two flanges 24 and 26 define aligned cylindrical journal surfaces 34 and 35 on which a ring 36 is guided.

This ring includes an external set of gear teeth 37 which are engaged with the output gear 13 of the gearbox and an internal set of gear teeth 38 which cooperate with the planet gears 30.

The ring 36 has a T-shaped cross section of which the vertical branch carrying the internal gear teeth is received and guided laterally in the space between the two confronting faces of the flanges 24, 26 and the horizontal branches define, on one side, concave bearing surfaces bearing on the journals 34, 35 and, on the other side, the external set of teeth 37.

An assembly including the differential housing 16 acting as a planet carrier, the sun gear 32, the planet gears 30 and the ring 36 constitutes a planetary gear train which occupies a volume usually not used between the differential and the output gear of the gearbox and which affords the two desired ranges of speeds.

For this purpose, the device is completed by means for locking at will the planetary gear train just described. The means includes an internal set of gear teeth 40 provided on the internal periphery of the flange 26, a plate 41 which is fixed by bolts 42 to the differential case and includes on an internal periphery a set of gear teeth 43 identical to the set of gear teeth provided on the flange 26.

The sun gear 32 is extended by a hollow shaft section 44 carrying external splines 45.

A shifting sleeve 46 having internal splines 47 is slidably mounted on the splines 45 and includes, on one hand, an external set of gear teeth 48 cooperable with either one of the two sets of gear teeth 40 and 43. The shifting sleeve is actuated by means of a shifting fork 49 which can be shifted by the user when the vehicle is stationary.

Such a device operates in the following manner: when the shifting sleeve 46 occupies the position shown in FIG. 1, the sun gear 32 is fixed relative to the planet carrier 24, 26 of the gear train interposed between the ring 36 and the differential 12. The effect is to prevent operation of the planetary gear train so that the ring 36 is fixed relative to the differential housing 16 and the ratio established in the gearbox is unmodified between the output of the gearbox and the input of the differential. In this way there is established in the transmission a long range of speed ratios.

In order to obtain greater motricity, the user shifts the shifting sleeve 46 to the position shown in FIG. 2, where the shifting sleeve fixes the sun gear 32 to the plate 41 and consequently to the case 10. The sun gear 32 constitutes in this way a reaction element, the planet carrier 24, 26 rotates in the same direction as the ring but at a slower speed and the intermediate planetary gear train introduces a coefficient of speed reduction between the output of the gearbox and the differential thereby making available a shorter range of speed ratios.

Figure 4:
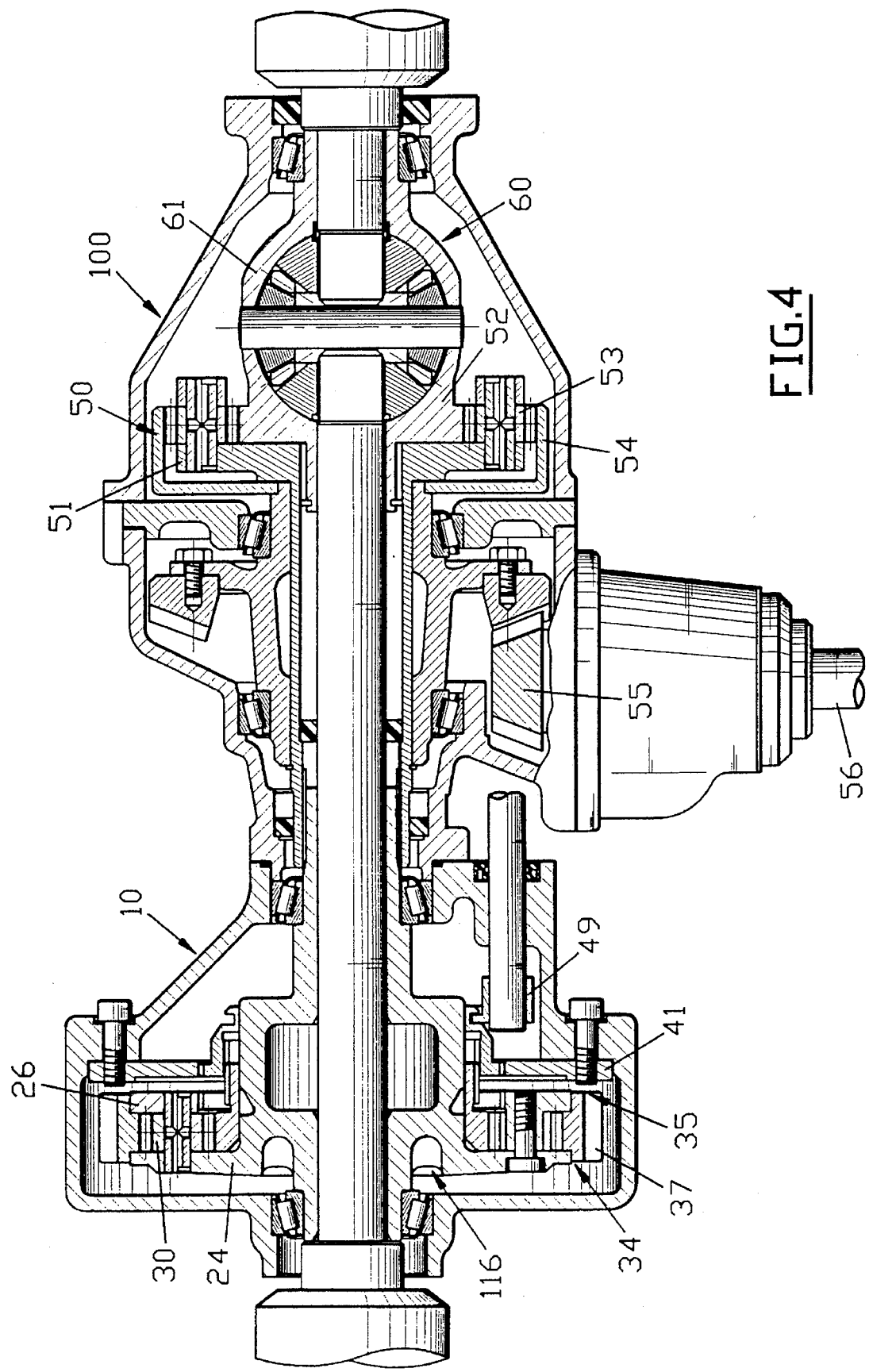
FIG. 4 is a sectional view of an alternative embodiment of a speed reducing mechanism according to the invention.

FIG. 4 shows a transmission for a vehicle having four driving wheels including, in a case 100, a central differential 50 connected to the output of the gearbox (not shown) by a speed reducing mechanism according to the invention such as that described with reference to FIGS. 1 to 3. The input element of the central differential, which is of the epicyclic gear train type, is constituted by a planet carrier 51 which is connected in such manner as to rotate with the planet carrier 116 of the speed reducing mechanism. The various elements of the latter are designated by the same reference numerals as in FIGS. 1 to 3.

The central differential further includes a sun gear 52 which is fixed to the housing of a differential 60 driving the front wheels of the vehicle, planet gears 53 and a ring 54 which drives through a bevel gear drive 55 and a longitudinal transmission shaft 56 connected to the differential of the rear wheels (not shown).

No further description of this device will be provided since the novelty resides mainly in the use of a speed reducing mechanism according to the invention disposed within the case 10.

In the arrangement according to the invention, the ring 36 is guided on smooth journals without a need to provide additional rolling bearings, which constitutes a simple solution of small size. In this respect, the journal surfaces are preferably subjected to an electrolytic treatment, for example to a sulphurizing or supersulphurizing treatment, or any other suitable type of treatment for imparting thereto the required properties as to surface state and resistance.

It will be observed that, in respect of the two embodiments, the presence of a long range and a short range is obtained by simple means of small size, since the additional speed reducing gear train is disposed within the normal overall size of the engine/gearbox unit with no need to substantially modify the cases. The addition of the plate 41 presents no particular problem.

The fact of disposing the speed reducing gear train on the downstream side of the gearbox avoids the necessity to increase the dimensions of the latter which remains unchanged with respect to the usual configuration.

The proposed device therefore affords a particularly simple and inexpensive solution as compared to the known solutions and may be used in different configurations: a vehicle having two or four driving wheels in association with a front differential or with a central differential or intermediate axles.

What is claimed is:

1. A speed reducing mechanism of the planetary gear train type comprising in combination: a case, a planet carrier rotatively mounted within said case, a ring having external gear teeth and internal gear teeth, a sun gear, and planet gears carried by said planet carrier and engaged with said sun gear and with said internal gear teeth of said ring, said planet carrier comprising a first radial flange defining at least one cylindrical journal rotatively supporting said ring, wherein said ring is solely supported by said planet carrier which is rotatably mounted on said case.

2. The speed reducing mechanism according to claim 1, further comprising a second radial flange carried by said first radial flange and defining with said first radial flange a space receiving said planet gears, said second radial flange defining a cylindrical journal located in the extension of said at least one cylindrical journal of said first radial flange, said journals rotatively supporting said ring.

3. The speed reducing mechanism according to claim 2, wherein said ring has a T-shaped cross section of which section a vertical branch is received and laterally guided in said space between said two radial flanges and of which section two lower parts of two horizontal branches are cooperative with said cylindrical journals of said two radial flanges.

4. The speed reducing mechanism according to claim 1, wherein said planet carrier comprises an axial part defining a cylindrical journal rotatively supporting said sun gear.

5. The speed reducing mechanism according to claim 1, comprising means for putting said reducing mechanism into a selected one of two states, said means comprising a shifting sleeve mounted to be slidable between two positions, namely a first position in which it renders two elements of said speed reducing mechanism relatively fixed, thereby locking said reducing mechanism, and a second position in which said shifting sleeve releases said two elements and fixes one of said two elements relative to said case.

6. The speed reducing mechanism according to claim 5, comprising an element fixed to said case and including inner teeth, said shifting sleeve comprising internal splines, said sun gear comprising an axial extension carrying external splines permanently engaged with said internal splines, said planet carrier comprising internal teeth, said shifting sleeve further comprising at least one set of external teeth which are engageable selectively with said internal teeth on said planet carrier and said internal teeth on said element fixed to said case.

7. The speed reducing mechanism according to claim 6, further comprising a second radial flange carried by said first radial flange and defining with said first radial flange a space receiving said planet gears, said second radial flange defining a cylindrical journal located in the extension of said at least one cylindrical journal of said first radial flange, said journals rotatively guiding said ring, said internal teeth provided on said planet carrier being arranged on said second radial flange.

8. A transmission device comprising in combination a gearbox and at least one differential both disposed in at least one case, said gearbox comprising an output gear and said at least one differential comprising a housing which constitutes an input element of said at least one differential, a ring engaged with said output gear of said gearbox and engaged with said input element of said at least one differential, and a speed reducing mechanism comprising in combination: a planet carrier rotatively mounted in said at least one case, said ring having external gear teeth and internal gear teeth, a sun gear, and planet gears carried by said planet carrier and engaged with said sun gear and with said internal gear teeth of said ring, said planet carrier comprising a radial flange defining at least one cylindrical journal by which said ring is rotatively supported, said speed reducing mechanism being interposed between said ring and said housing of said at least one differential, said housing constituting said planet carrier of said speed reducing mechanism, and means for putting said speed reducing mechanism in a selected one of two states: namely a first state in which said speed reducing mechanism is locked against operation and introduces no speed reduction, and a second state in which said speed reducing mechanism is operative.

* * * * *